July 31, 1923.

R. C. MATSON 1,463,710

PHOTOGRAPHIC FILM AND PLATE HOLDER

Filed April 25, 1921

Inventor:
Ralph Charles Matson
by Atty.

July 31, 1923.
R. C. MATSON
PHOTOGRAPHIC FILM AND PLATE HOLDER
Filed April 25, 1921      2 Sheets-Sheet 2
1,463,710
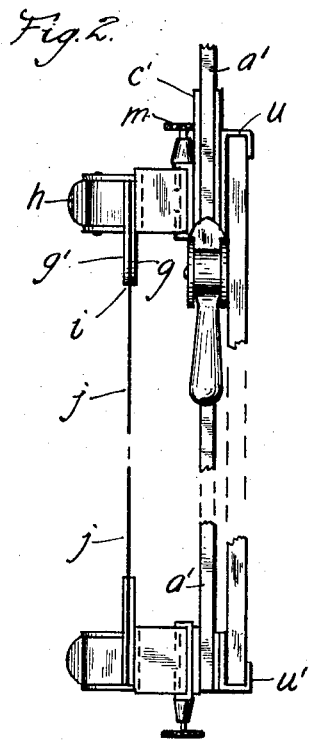
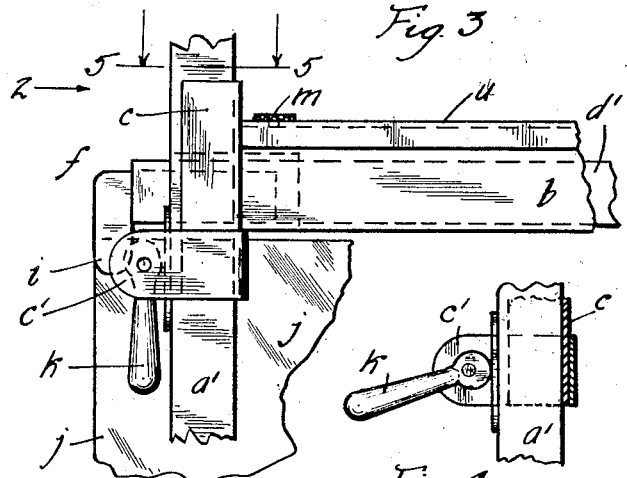
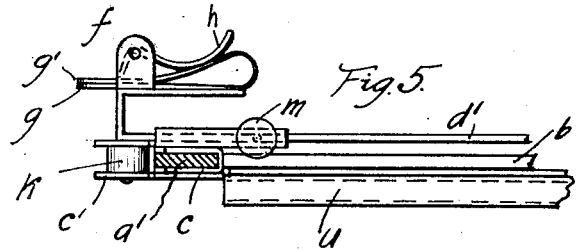
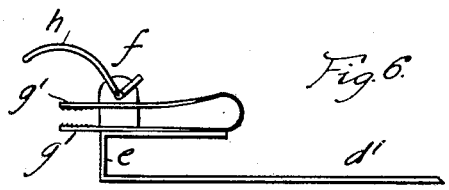
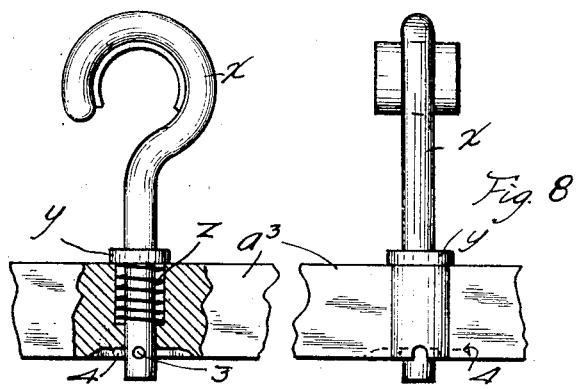
Inventor:
Ralph Charles Matson Patented July 31, 1923.

1,463,710

UNITED STATES PATENT OFFICE.

RALPH CHARLES MATSON, OF PORTLAND, OREGON.

PHOTOGRAPHIC FILM AND PLATE HOLDER.

Application filed April 25, 1921. Serial No. 464,149.

*To all whom it may concern:*

Be it known that I, RALPH CHARLES MATSON, a citizen of the United States, and a resident of the city of Portland, county of Multnomah, and State of Oregon, have invented a certain new and useful Improvement in Photographic Film and Plate Holders, of which the following is a specification.

My invention relates to holders for photographic negatives, and other plates and films, such holders as are used for holding the plates and films while being worked upon, or otherwise handled.

The object of my invention is to provide a simple and convenient holder adapted for use with plates and films varying greatly in size.

It is further my object to provide a photographic plate and film holder which may be adjusted to accommodate the particular size of plate or film for which it is to be used; that is to say, the user knowing the size of the plate or film can adjust his holder in advance to such particular size.

I attain my object in a holder which consists substantially of the rectangular skeleton metal frame, provided with an intermediate adjustable cross-bar, and the latter and one end of the frame being provided with laterally extensible arms, the extremities of which are provided with holding clamps.

My invention also includes means for holding a plate at its ends on the cross-bar of one end of the frame and said intermediate adjustable cross-bar; also includes means for determining the required positioning of said intermediate cross-bar and said extensible arms for spacing the said holding elements relatively to the size of the plate or film to be secured on the holder.

My invention also includes means for securing the adjustable parts in place as adjusted.

Other features of my invention are hereinafter fully described and illustrated in the accompanying drawings.

The latter represent as follows:

Fig. 2 is a fragmentary end elevation looking in the direction indicated by the arrow 2 of Fig. 3; showing the lower cross-bar of the rectangular main frame, and the intermediate adjustable cross-bar slidably mounted on the sides of the main frame;

Fig. 3 is a fragmentary rear side elevation showing one side of the main frame, and a part of said intermediate adjustable cross-bar slidably mounted on the sides of the main frame; this view also illustrates the means provided for securing the intermediate adjustable cross bar in place as positioned;

Fig. 4 is a fragmentary detail illustrating the operation of the cam means provided for securing the intermediate adjustable cross-bar in place;

Fig. 5 is a fragmentary section taken on the broken line 5 of Fig. 3 looking in the direction indicated by the arrow; this view illustrates details of the construction hereinafter fully described;

Fig. 6 is a fragmentary detail of one of the adjustable extension arms illustrating particularly the clamps provided on such extension arms for securing a film in place; and Fig. 7 and 8 are details of an adjustable hook provided on the upper end cross-bar of the main frame, for suspending the latter from a peg or wire.

Figure 1:
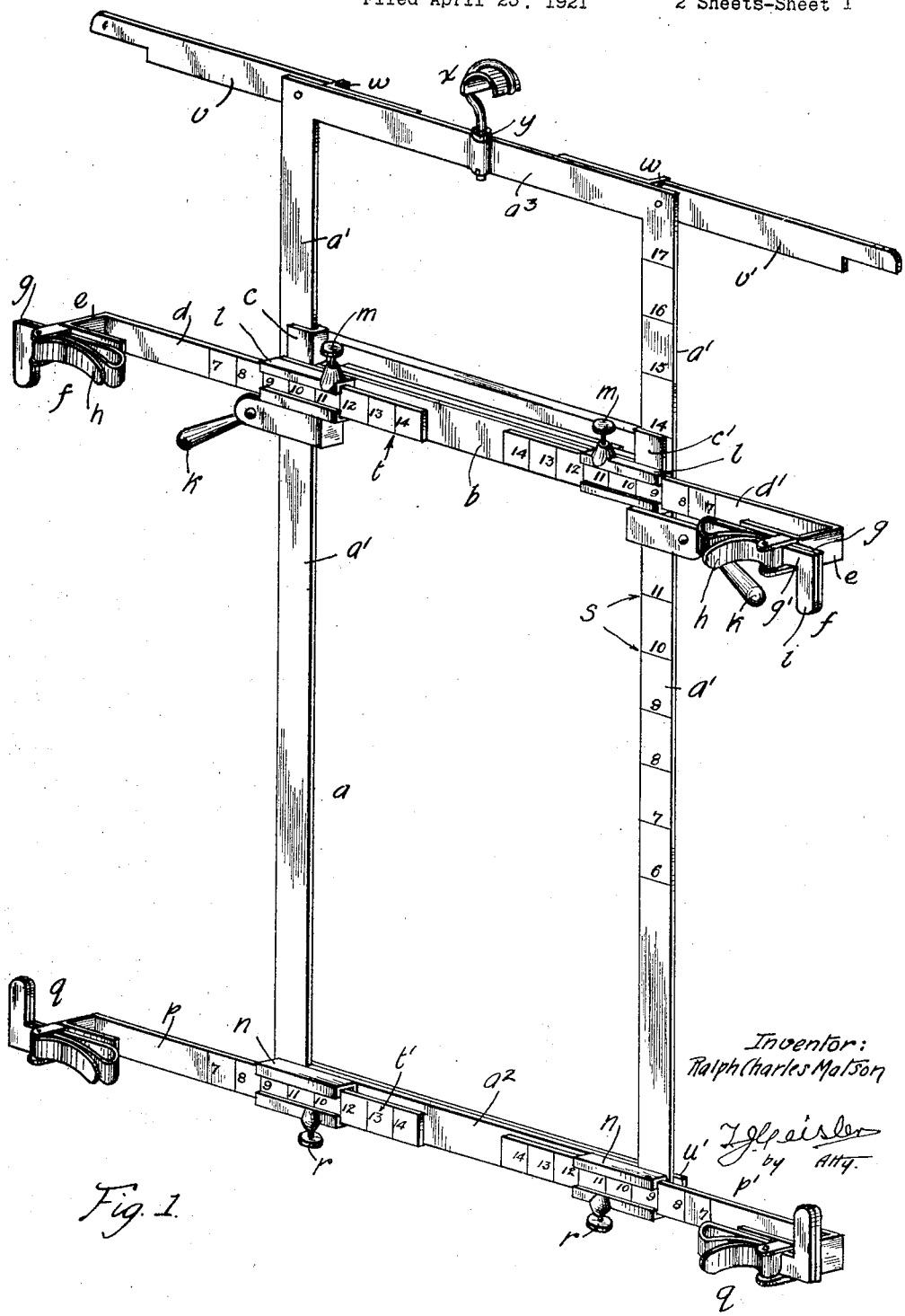
Fig. 1 shows a perspective elevation of one side of my photographic plate holder.

My holder consists of a skeleton metal main frame preferably of elongate shape, having its side bars substantially longer than the end cross bars.

On the side bars $a$, $a'$ of the main frame is slidably mounted an intermediate adjustable cross-bar $b$, the ends of which are provided with shoes $c$, $c'$ sliding on the sides of the main frame. On the adjustable intermediate cross bar $b$ are slidably mounted two extension arms $d$, $d'$, the outer extremities $e$ of which are formed so as to provide supports for film clamps $f$. The construction of these clamps is best seen from Figs. 5 and 6. It comprises a pair of jaws $g$ and $g'$ of which the latter is compressible against the former by means of a cam lever $h$. The members $g$, $g'$ of the clamps $f$ are respectively made with perpendicular portions as $i$ so as to facilitate the clamping of a film between them, as illustrated in Fig. 3, in which $j$ represents a portion of the film.

The means for securing the adjustable intermediate cross-bar $b$ in place consist of cams $k$, pivoted in the extensions $c'$ of the shoes $c$. The extension arms $d$, and $d'$ slide in guides $l$ (see Fig. 1) provided on said intermediate adjustable cross arm $b$ and the extension arms $d$, $d'$ are held in position as adjusted by set-screws $m$.

The lower end cross-bar $a^2$ of the main frame $a$ is also provided with guides $n$ in which slide extension arms $p$, $p'$ which bear on their extremities clamps $q$ similar in construction and operation to the clamps $f$ of the extension arms $d$, $d'$ and the latter are secured in place as adjusted by set screws $r$.

Means are provided for determining the required positions of the intermediate cross-bar $b$ relatively to the desired spacing of the film-holding clamps $f$ lengthwise of the main frame.

Such means may consist of graduations in inches, as represented by the cross lines $s$ and numerals adjacent the same. For the same purpose each of the extension arms $d$ and $d'$, and $p$ and $p'$, are also provided with graduations as represented at $t$ and $t'$, thus films of various sizes, both with respect to their length or their breadth, may be supported by my plate holder, and the frame may be definitely adjusted in advance to accommodate the particular film.

The back of the cross-bar $a^2$ of the main frame $g$, and likewise the adjustable intermediate cross-arm $b$ are respectively provided with channels or grooves as $u$ and $u'$, as more clearly shown in Fig. 2 for holding photo plates.

The top-cross bar $a^3$ of the main frame is provided with hinged arms $v$, $v'$ adapted for being laterally extended as illustrated in Fig. 1, and serving as a support for the frame; $w$ being stops holding the arms in their extended position.

The top cross bar $a^3$ is also provided with a hook $x$ provided with a collar $y'$ against which bears an expansion coil-spring $z$, and the shank of the hook is provided with a pin 3 adapted for seating in the groove 4 so that the hook may be adjusted and secured in place in either one of its two positions shown in Figs. 7 and 8.

The illustrations of my photographic plate and film holder in the drawings is to be understood as giving merely its essential principles of operation; the details of construction being variable so long as said principles are adhered to.

I claim:

1. A photo plate and film holder comprising a rectangular frame, an intermediate adjustable cross-bar movably supported on the two sides of the frame, extension arms carried by one end of said intermediate adjustable cross-bar and the corresponding end of the cross-bar constituting one end of the frame, and holding clamps on the extremities of said extension arms.

2. A photo plate and film holder comprising a rectangular frame, an intermediate adjustable cross-bar movably supported on two sides of the frame, extension arms carried by one end of said intermediate adjustable cross-bar and the corresponding end of the cross-bar constituting one end of the frame, holding elements on the extremities of said extension arms, such holding elements being located on the front of the frame, and other holding elements carried by said intermediate adjustable cross-bar and said cross-arm of one end of the frame, such holding elements being located on the back of the frame.

3. A photo plate and film holder comprising a rectangular frame, an intermediate adjustable cross-bar movably supported on two sides of the frame, extension arms carried by one end of said intermediate adjustable cross-bar and the corresponding end of the cross-bar constituting one end of the frame, holding elements on the extremities of said extension arms, and means for determining the required positioning of said intermediate cross-bar and said extension arms thereby spacing said holding elements relatively to the size of the plate or film to be secured on the holder.

4. A photo plate and film holder comprising a rectangular frame, an intermediate adjustable cross-bar movably supported on two sides of the frame, extension arms carried by each end of said intermediate adjustable cross-bar and of the cross-bar constituting one end of the frame, holding means on the extremities of said extension arms, and means for determining the required positioning of said intermediate cross-bar and said extension arms, thereby spacing said holding elements relatively to the size of the plate or film to be secured on the holder.

5. A photo plate and film holder comprising a rectangular frame, an intermediate adjustable cross-bar movably supported on two sides of the frame, guides on one end of said intermediate adjustable cross-bar and the corresponding end of cross-bar constituting one end of the frame, extension arms adjustable in such guides, holding clamps on the extremities of said extension arms, and means for determining the required positioning of said intermediate cross-bar and said extension arms, thereby spacing said holding elements relatively to the size of the plate or film to be secured on the holder.

RALPH CHARLES MATSON.